(12) United States Patent
Poomalai et al.

(10) Patent No.: US 9,686,316 B2
(45) Date of Patent: Jun. 20, 2017

(54) LAYER-2 SECURITY FOR INDUSTRIAL AUTOMATION BY SNOOPING DISCOVERY AND CONFIGURATION MESSAGES

(71) Applicant: Cisco Technology, Inc., San Jose, CA (US)

(72) Inventors: Vinod Kumar Poomalai, Salem (IN); Karan Capoor, Bangalore (IN); Srivastava Yamarthy, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 82 days.

(21) Appl. No.: 14/865,096

(22) Filed: Sep. 25, 2015

(65) Prior Publication Data

US 2017/0093912 A1  Mar. 30, 2017

(51) Int. Cl.
*H04L 29/06* (2006.01)
(52) U.S. Cl.
CPC ................... *H04L 63/162* (2013.01)
(58) Field of Classification Search
CPC .................................................. H04L 63/162
See application file for complete search history.

(56) References Cited

U.S. PATENT DOCUMENTS

| | | | | |
|---|---|---|---|---|
| 8,521,856 B2* | 8/2013 | Davis | ................ | H04L 29/12264 370/356 |
| 8,782,771 B2* | 7/2014 | Chen | ................... | H04L 63/0245 713/168 |
| 8,964,743 B2* | 2/2015 | Wang | ...................... | H04L 12/18 370/390 |
| 2005/0243739 A1* | 11/2005 | Anderson | ......... | H04L 29/12009 370/254 |
| 2008/0320582 A1* | 12/2008 | Chen | ................... | H04L 63/0245 726/12 |
| 2009/0019367 A1* | 1/2009 | Cavagnari | ............... | G06F 21/62 715/716 |

(Continued)

OTHER PUBLICATIONS

Oh, et al., "Advanced Protocol to Prevent Man-In-The-Middle Attack in SCADA System", International Journal of Security and Its Applications, vol. 8, No. 2., Mar. 2014, pp. 1-8.

*Primary Examiner* — Ali Shayanfar
(74) *Attorney, Agent, or Firm* — Parker Ibrahim & Berg LLC; James M. Behmke; Stephen D. LeBarron

(57) ABSTRACT

In one embodiment, a switch in a computer network listens to a device naming exchange on trusted interfaces to learn device names of devices reachable on interfaces of the switch. The switch then listens to the device naming exchange to learn a corresponding interface of the switch on which each particular (named) device is reachable, and associates each learned device name to the learned corresponding interface for that particular device. The switch then allows identity responses from only learned device names on their corresponding interface. In another embodiment, the switch also listens to an IP address assigning exchange on the trusted interfaces to learn IP addresses assigned to each particular device, and associates each learned IP address with a corresponding learned device name and its corresponding interface. The switch then allows address resolution responses from only learned IP addresses from their corresponding learned device names on their corresponding interface.

16 Claims, 27 Drawing Sheets

(56) References Cited

U.S. PATENT DOCUMENTS

| | | | |
|---|---|---|---|
| 2010/0077471 A1* | 3/2010 | Schleiss | G05B 19/0428 726/13 |
| 2011/0103258 A1* | 5/2011 | Chung | H04L 67/1097 370/254 |
| 2011/0258262 A1* | 10/2011 | Bezdicek | H04L 67/2823 709/206 |
| 2013/0148654 A1* | 6/2013 | Sayani | H04L 49/70 370/389 |
| 2014/0372617 A1* | 12/2014 | Houyou | H04L 41/145 709/226 |
| 2014/0380001 A1* | 12/2014 | Schubert | G06F 9/5077 711/153 |
| 2015/0358233 A1* | 12/2015 | Wang | H04L 45/02 370/392 |

* cited by examiner

▽ Ethernet II, Src.: 00:0e:8c:8a:a4:d4 (00:0e:8c:8a:a4:d4), Dst: 01:0e:cf:00:00:00 (01:0e:cf:00:00:00)
  △ Destination: 01:0e:cf:00:00:00 (01:0e:cf:00:00:00)
  △ Source: 00:0e:8c:8a:a4:d4 (00:0e:8c:8a:a4:d4)
    Type: 802.1Q Virtual LAN (0x8100)
▽ 802.1Q Virtual LAN, PRI: 0, CFI: 0, ID: 0
  1... .... .... = Priority: Best Effort (default) (0)
  ...0 .... .... = CFI: Canonical (0)
  .... 0000 0000 0000 = ID: 0
  Type: PROFINET (0x8892)
▽ PROFINET acyclic Real-Time, ID:0xfefe, Len: 44
  FrameID: 0xfefe (Real-Time: DCP (Dynamic Configuration Protocol) identify multicast request)
▽ PROFINET DCP, Ident Req, Xid: 0x1010030, NameOfStation: "dev4-profi-2"
  ServiceID: Identify (5)
  ServiceType: Request (0)
  Xid: 0x01010030
  ResponseDelay: 1
  DCPDataLength: 16
  ▽ Block: Device/NameOfStation, "dev4-profi-2"
    Option: Device properties (2)
    Suboption: Name of Station (2)
    DCPBlockLength: 12
    NameOfStation: dev4-profi-2

▽ Ethernet II, Src: 9c:b2:06:10:03:3f (9c:b2:06:10:03:3f), Dst: 00:0e:8c:8a:a4:d4 (00:0e:8c:8a:a4:d4)
  ▷ Destination: 00:0e:8c:8a:a4:d4 (00:0e:8c:8a:a4:d4)
  ▷ Source: 9c:b2:06:10:03:3f (9c:b2:06:10:03:3f)
    Type: 802.1Q Virtual LAN (0x8100)
▽ 802.1Q Virtual LAN, PRI: 0, CFI: 0, ID: 0
  1... .... .... ....  = Priority: Best Effort (default) (0)
  ...0 .... .... ....  = CFI: Canonical (0)
  .... 0000 0000 0000  = ID: 0
    Type: PROFINET (0x8892)

▽ PROFINET acyclic Real-Time, ID:0xfeff, Len: 102
    FrameID: 0xfeff (Real-Time: DCP (Dynamic Configuration Protocol) identify response)

▽ PROFINET DCP, Ident OK, Xid: 0x1010030, NameOfStation: "dev4-profi-2", Dev-Options(5), DeviceVendorValue, Dev-ID, Dev-Role, IP, DeviceInitiative
    ServiceID: Identify (5)

ServiceType: Response Success (1)

Xid: 0x01010030
    Reserved: 0
    DCPDataLength: 92
  ▷ Block: Device/NameOfStation, BlockInfo: Reserved, "dev4-profi-2"
  ▷ Block: Device/Device Options, BlockInfo: Reserved, 5 options
  ▷ Block: Device/Manufacturer specific, BlockInfo: Reserved, DeviceVendorValue: "PND-001"
    Padding: 1 byte
  ▷ Block: Device/Device ID, BlockInfo: Reserved, VendorID: 0x4000 / DeviceID: 0x0001
  ▷ Block: Device/Device Role, BlockInfo: Reserved, IO-Device
  ▷ Block: IP/IP, BlockInfo: IP not set, IP: 0.0.0.0, Subnet: 0.0.0.0, Gateway: 0.0.0.0
  ▷ Block: DeviceInitiative/DeviceInitiative, BlockInfo: Reserved

▷ Ethernet II, Src.: 00:0e:8c:8a:a4:d4 (00:0e:8c:8a:a4:d4), Dst: 9c:b2:06:10:03:3f (9c:b2:06:10:03:3f)
  ▵ Destination: 9c:b2:06:10:03:3f (9c:b2:06:10:03:3f)
  ▵ Source: 00:0e:8c:8a:a4:d4 (00:0e:8c:8a:a4:d4)
    Type: 802.1Q Virtual LAN (0x8100)
▷ 802.1Q Virtual LAN, PRI: 0, CFI: 0, ID: 0
  1. ... ...  .0 ... ...  ...  = Priority: Best Effort (default) (0)
     ... ...  ...  ...  ...  = CFI: Canonical (0)
     ... 0000 0000 0000 = ID: 0
     Type: PROFINET (0x8892)
▷ PROFINET acyclic Real-Time, ID:0xfefd, Len: 44
    FrameID: 0xfefd (Real-Time: DCP (Dynamic Configuration Protocol) get/set)
▷ PROFINET DCP, Set Req, Xid: 0x1000005, IP, End-Trans
    ServiceID: Set (4)
    ServiceType: Request (0)
    Xid: 0x01000005
    Reserved: 0
    DCPDataLength: 24
  ▵ Block: IP/IP, BlockQualifier: Use the value temporary, IP: 192.168.0.5, Subnet: 255.255.255.0, Gateway: 192.168.0.5
  ▵ Block: Control/End-Transaction

740

▽ Ethernet II, Src.: 9c:b2:06:10:03:3f (9c:b2:06:10:03:3f), Dst: 00:0e:8c:8a:a4:d4 (00:0e:8c:8a:a4:d4)
  △ Destination: 00:0e:8c:8a:a4:d4 (00:0e:8c:8a:a4:d4)
  △ Source: 9c:b2:06:10:03:3f (9c:b2:06:10:03:3f)
    Type: 802.1Q Virtual LAN (0x8100)
▽ 802.1Q Virtual LAN, PRI: 0, CFI: 0, ID: 0
  1. ... .... .... .... = Priority: Best Effort (default) (0)
    ...0 .... .... .... = CFI: Canonical (0)
    .... 0000 0000 0000 = ID: 0
    Type: PROFINET (0x8892)
▽ PROFINET acyclic Real-Time, ID:0xfefd, Len: 44
    FrameID: 0xfefd (Real-Time: DCP (Dynamic Configuration Protocol) get/set)
▽ PROFINET DCP, Set Ok, Xid: 0x1000005, Response(Ok), Response(Ok)
    ServiceID: Set (4)
    ServiceType: Response Success (1)
    Xid: 0x01000005
    Reserved: 0
    DCPDataLength: 16
  △ Block: Control/Response, Status from IP - IP Parameter, BlockError: Ok
    Padding: 1 byte
  △ Block: Control/Response, Status from Control - End Transaction, BlockError: Ok
    Padding: 1 byte

| INTERFACE 910 | DEVICE NAME 920 | IP ADDRESS 930 | MAC ADDRESS 940 |
|---|---|---|---|
| Gi0/1 | Device1 | -- | aa:bb:cc:dd:ee:01 |
| Gi0/2 | Device2 | -- | aa:bb:cc:dd:ee:02 |

FIG. 9B

| INTERFACE 910 | DEVICE NAME 920 | IP ADDRESS 930 | MAC ADDRESS 940 |
|---|---|---|---|
| Gi0/1 | Device1 | 10.1.1.5 | aa:bb:cc:dd:ee:01 |
| Gi0/2 | Device2 | 10.1.1.6 | aa:bb:cc:dd:ee:02 |

▷ Ethernet II, Src.: 00:0e:8c:8a:a4:d4 (00:0e:8c:8a:a4:d4), Dst: 9c:b2:06:10:03:3f (9c:b2:06:10:03:3f)
   △ Destination: 9c:b2:06:10:03:3f (9c:b2:06:10:03:3f)
   △ Source: 00:0e:8c:8a:a4:d4 (00:0e:8c:8a:a4:d4)
      Type: 802.1Q Virtual LAN (0x8100)
▽ 802.1Q Virtual LAN, PRI: 0, CFI: 0, ID: 0
   1. ... .... .... .... = Priority: Best Effort (default) (0)
      ...0 .... .... .... = CFI: Canonical (0)
      .... 0000 0000 0000 = ID: 0
      Type: PROFINET (0x8892)

▷ PROFINET acyclic Real-Time, ID:0xfefd, Len: 44
      FrameID: 0xfefd (Real-Time: DCP (Dynamic Configuration Protocol) get/set)

▷ PROFINET DCP, Set Req, Xid: 0x1000005, IP, End-Trans
      ServiceID: Set (4)

ServiceType: Request (0)

Xid: 0x01000005
      Reserved: 0
      DCPDataLength: 24

△ Block: IP/IP, BlockQualifier: Use the value temporary, IP: 192.168.0.5, Subnet: 255.255.255.0, Gateway: 192.168.0.5

△ Block: Control/End-Transaction

FIG. 10

| INTERFACE 910 | DEVICE NAME 920 | IP ADDRESS 930 | MAC ADDRESS 940 |
|---|---|---|---|
| Gi0/1 | Device1 | -- | aa:bb:cc:dd:ee:01 |
| Gi0/2 | Device2 | -- | aa:bb:cc:dd:ee:02 |
| Gi0/3 | -- | -- | hh:aa:cc:kk:rr:01 |

FIG. 12

| INTERFACE 910 | DEVICE NAME 920 | IP ADDRESS 930 | MAC ADDRESS 940 |
|---|---|---|---|
| Gi0/1 | Device1 | -- | aa:bb:cc:dd:ee:01 |
| Gi0/2 | Device2 | 10.1.1.6 | aa:bb:cc:dd:ee:02 |

| INTERFACE 910 | DEVICE NAME 920 | IP ADDRESS 930 | MAC ADDRESS 940 |
|---|---|---|---|
| Gi0/1 | Device1 | 10.1.1.5 | aa:bb:cc:dd:ee:01 |
| Gi0/2 | Device2 | 10.1.1.6 | aa:bb:cc:dd:ee:02 |

LAYER-2 SECURITY FOR INDUSTRIAL AUTOMATION BY SNOOPING DISCOVERY AND CONFIGURATION MESSAGES

TECHNICAL FIELD

The present disclosure relates generally to computer networks, and, more particularly, to layer-2 security for industrial automation (e.g., the PROFINET protocol) by snooping discovery and configuration messages (e.g., DCP snooping).

BACKGROUND

Many network communication protocols have been defined over the years based on particular situations, such as for large-scale networks, localized networks, proprietary networks, and, in particular, industrial automation networks. For instance, the PROFINET protocol is one such example of a protocol designed primarily for industrial automation. However, the PROFINET protocol itself has very limited security measures, such as the Frame ID (used for detecting and identifying communication relations), and the Cycle Counter (representing a security function to a certain extent because it used to monitor the I/O data exchange). Owing to the lack of further security provisions, many industrial automation protocols, particularly PROFINET (and even more particularly the discovery and configuration protocol (DCP) portion of PROFINET), are vulnerable to spoofing and man-in-the-middle (MIM) related security threats.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7D illustrate example simplified Wireshark captures of PROFINET packets;

FIGS. 9A-9B illustrate example simplified DCP snooping tables;

FIG. 10 illustrates an example simplified Wireshark capture of a DCP "SET" packet;

FIG. 12 illustrates an example simplified DCP snooping table;

FIG. 17 illustrates an example simplified DCP snooping table;

DESCRIPTION OF EXAMPLE EMBODIMENTS

Overview

According to one or more embodiments of the disclosure, a switch in a computer network listens to a device naming exchange (e.g., a DCP SET Packet Request) on one or more trusted interfaces of the switch to learn device names of devices reachable on interfaces of the switch. The switch then listens to the device naming exchange (e.g., a DCP SET OK Response) to learn a corresponding interface of the switch on which each particular device, with a learned device name, is reachable, and associates each learned device name to the learned corresponding interface for that particular device, accordingly. The switch may then allow identity responses from only learned device names on their corresponding interface.

According to one or more additional embodiments of the disclosure, the switch also listens to an Internet Protocol (IP) address assigning exchange (e.g., a DCP SET Request frame) on the one or more trusted interfaces of the switch to learn IP addresses assigned to each particular device, and associates each learned IP address with a corresponding learned device name and its corresponding interface. The switch may then allow address resolution responses from only learned IP addresses from their corresponding learned device names on their corresponding interface.

Description

A computer network is a geographically distributed collection of nodes interconnected by communication links and segments for transporting data between end nodes, such as personal computers and workstations, or other devices, such as sensors, actuators, controllers, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. Other types of networks are available, such as various proprietary or special purpose networks, such as industrial networks.

Industrial automation deals primarily with the automation of manufacturing, quality control and material handling processes. Industrial automation networks, in particular, are generally concerned with no-loss on-time delivery of sensed data and/or actuator instructions. As such, many protocols have been developed for the deterministic delivery of transmitted data. Industrial automation networks must also interoperate with both current and legacy systems, and must provide predictable performance and maintainability, and should provide security both from intrusions from outside the plant, and from inadvertent or unauthorized use within the plant. One example standard to industrial automation (e.g., industrial Ethernet) is the known PROFINET (Process Field Net) standard, described further below.

Figure 1:
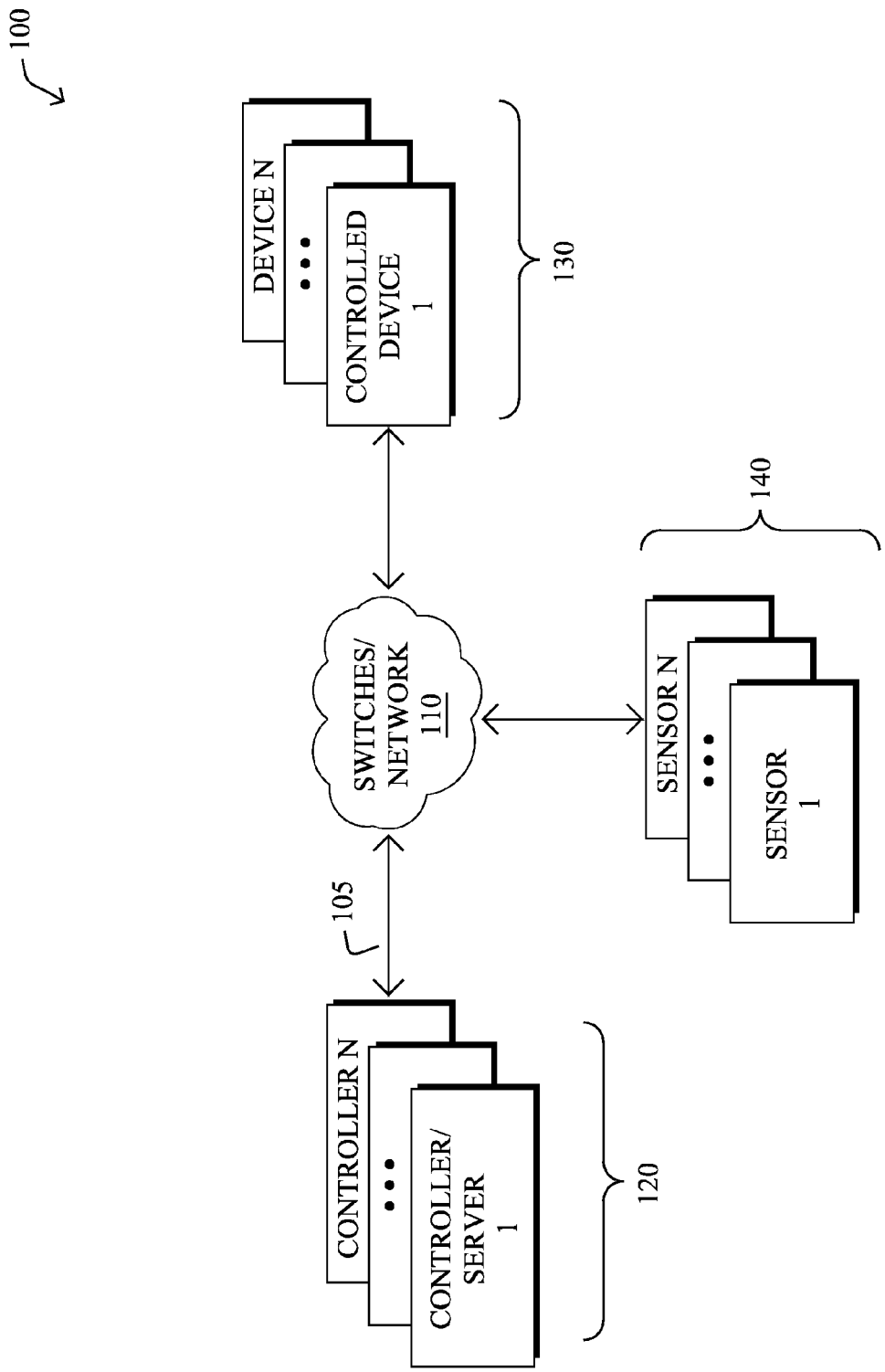
FIG. 1 illustrates an example simplified communication network.

FIG. 1 is a schematic block diagram of a simplified example computer system 100 illustratively comprising links 105 interconnecting one or more devices through a network of switches 110. For example, a set of one or more controllers (or servers) 120 may be interconnected with a set of one or more controlled devices 130 and one or more sensors 140, such as part of an industrial automation network. The devices, generally, may be interconnected by various methods of communication. For instance, the links 105 may be wired links, and particularly for the industrial automation networks illustrated herein, may be wired Ethernet links. Those skilled in the art will understand that any number of nodes, devices, links, etc. may be used in the computer network, and that the view shown herein is for simplicity. Also, those skilled in the art will further understand that while the network is shown in a certain orientation, system 100 is merely an example illustration that is not meant to limit the disclosure.

Data packets (e.g., traffic and/or messages sent between the devices/nodes) may be exchanged among the nodes/devices of the computer system 100 using predefined network communication protocols such as certain known protocols (e.g., Ethernet protocols), where appropriate. In this context, a protocol consists of a set of rules defining how the nodes interact with each other.

Figure 2:
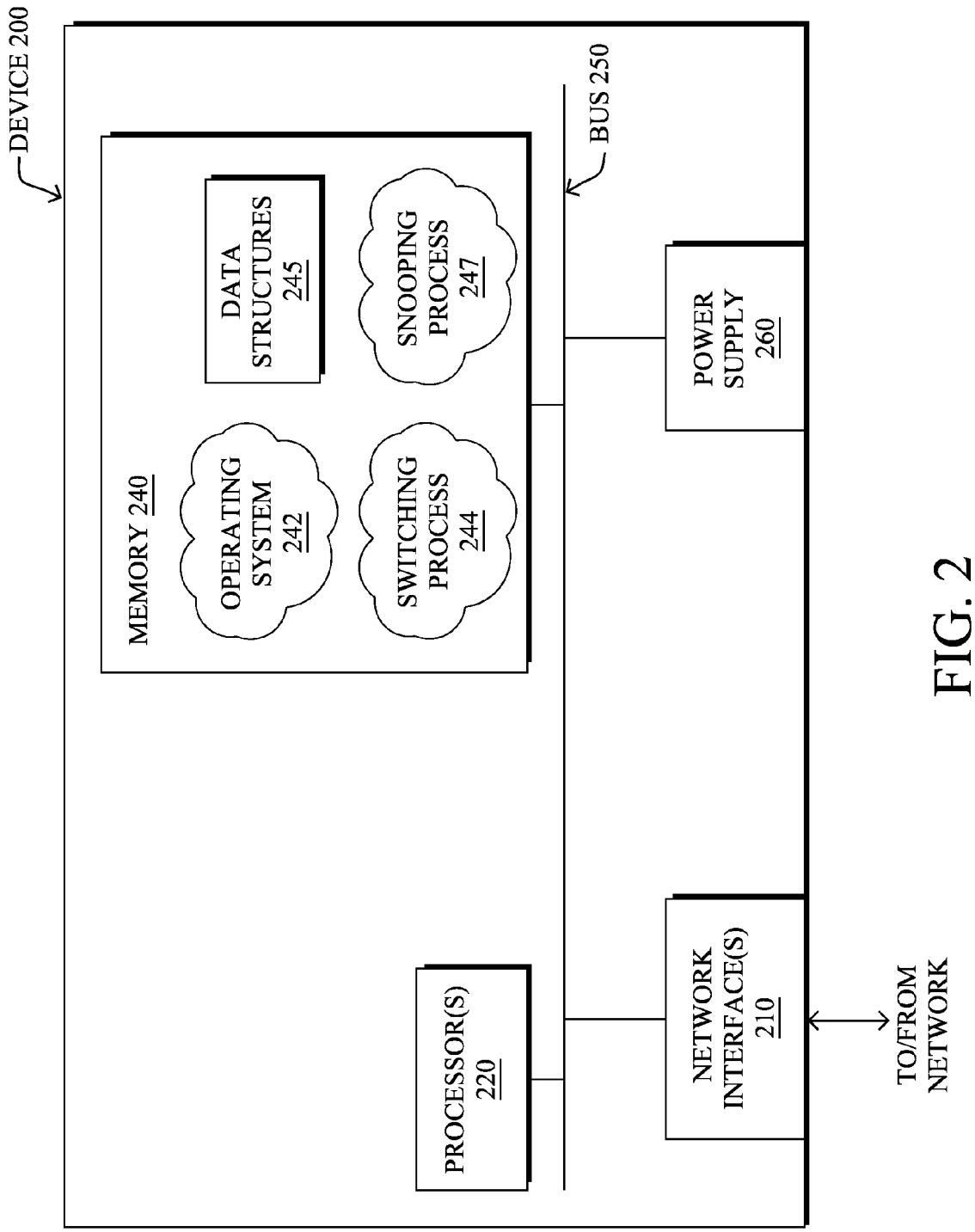
FIG. 2 illustrates an example simplified network device/node.

FIG. 2 is a schematic block diagram of an example device 200 that may be used with one or more embodiments described herein, e.g., as any of the devices shown in FIG. 1 above, particularly as a switch 110 as described herein. The device may comprise one or more network interfaces 210 (e.g., Ethernet), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links coupled to the network 100. The network interfaces may be configured to transmit and/or receive data using a variety of different communication protocols, which illustratively herein may be Ethernet protocols or other suitable protocols used in industrial automation networks (or other applicable networks).

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise switching process 244, and an illustrative "snooping" process 247, as described herein. Note that while switching process 244 is shown in centralized memory 240, alternative embodiments provide for the process to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Switching process (services) 244 include computer executable instructions executed by the processor 220 to perform functions provided by one or more switching protocols, such as various Ethernet-based switching protocols as will be understood by those skilled in the art. These functions may, on capable devices, be configured to manage various data structures 245 that include data used to make switching decisions.

As noted above, industrial automation networks are generally deterministic networks, providing predictable performance and maintainability, and should provide security both from intrusions from outside the plant, and from inadvertent or unauthorized use within the plant. As also noted, one example standard to industrial automation is the widely used PROFINET standard.

Figure 3:
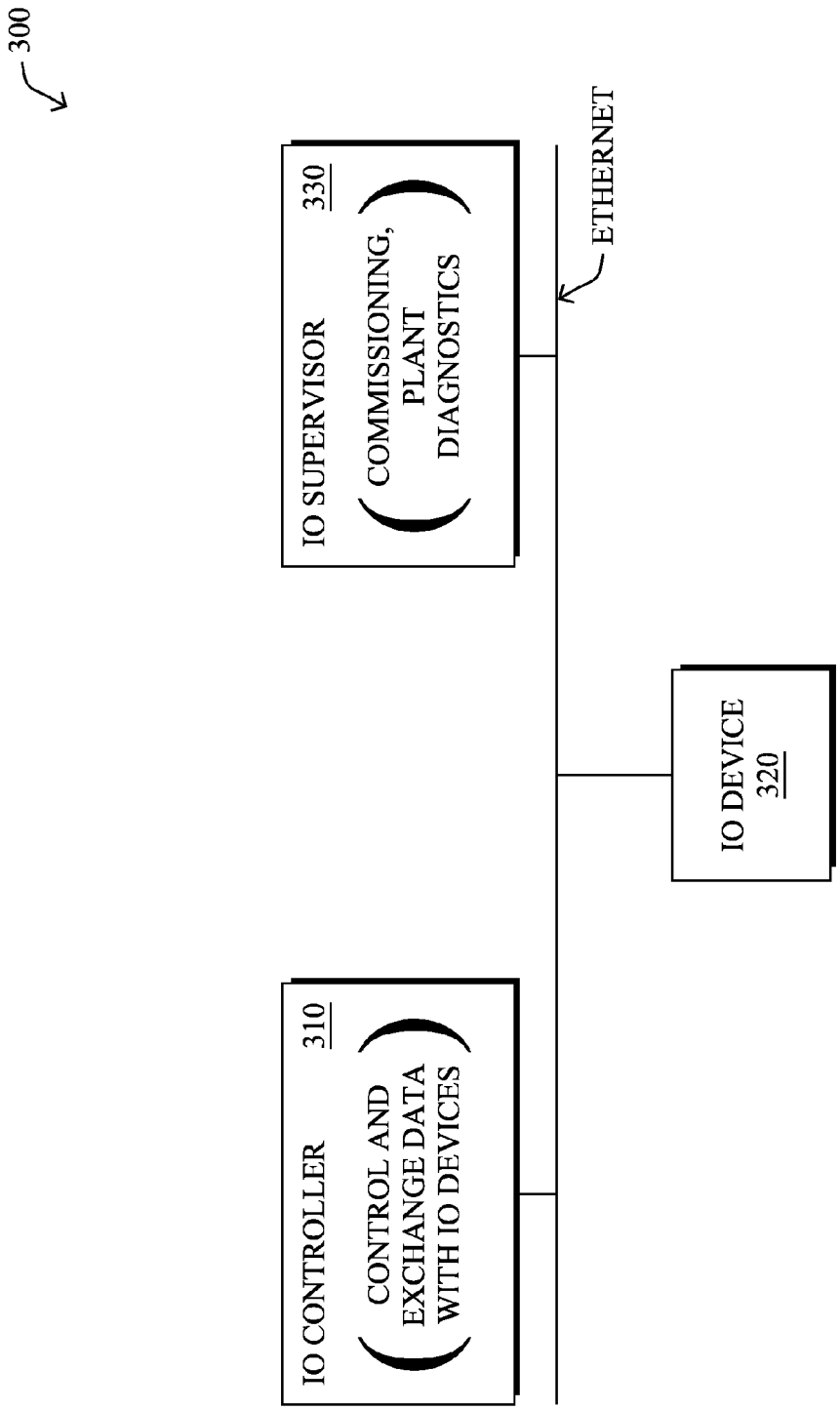
FIG. 3 illustrates an example simplified industrial automation network.

As shown in FIG. 3, a typical system components of a PROFINET industrial I/O (or simply "IO") system 300 (a specific implementation/component of network 100) consists of three components:

IO Controller 310—Controls the automation task;

IO device 320—field device monitored and controlled by IO controller (may consist of a several modules and sub-modules); and IO Supervisor 330—Software on device/PC to set parameters and diagnose individual IO devices.

An Application Relation (AR) is established between an IO Controller and an IO Device. These ARs are used to define Communication Relations (CR) with different characteristics for the transfer of parameters, cyclic exchange of data and handling of alarms. Also, each device/module within a PROFINET network has three addresses: MAC address, IP address, and device name (a logical name for the module within the total configuration). Because PROFINET uses TCP/IP, a MAC and IP address are used. (A MAC address changes if the device is replaced. An IP address is a form of dynamic addressing. Because there was a need for a fixed address a device name is used.) Generally, for allocation of the IP address, subnet mask, and default gateway two methods are defined: Discovery and Configuration Protocol (DCP); and Dynamic Host Configuration Protocol (DHCP).

In general, the protocol stack and message structure for PROFINET IO uses three different communication channels to exchange data with programmable controllers and other devices. The standard TCP/IP channel is used for parameterization configuration and acyclic read/write operations (e.g., with reaction times in the range of 100 ms). The RT or Real Time channel is used for standard cyclic data transfer and alarms (e.g., with up to 10 ms cycle times). RT communications bypass the standard TCP/IP interface to expedite the data exchange with Programmable Controllers. The third channel, Isochronous Real Time (IRT) is the very high speed channel used for Motion Control applications (e.g., with cycles times of less than 1 ms). Notably, the protocols can be recorded and displayed using an Ethernet analysis tool such as Wireshark, while the topology can be shown using analysis tools such as TH Scope.

Figure 4:
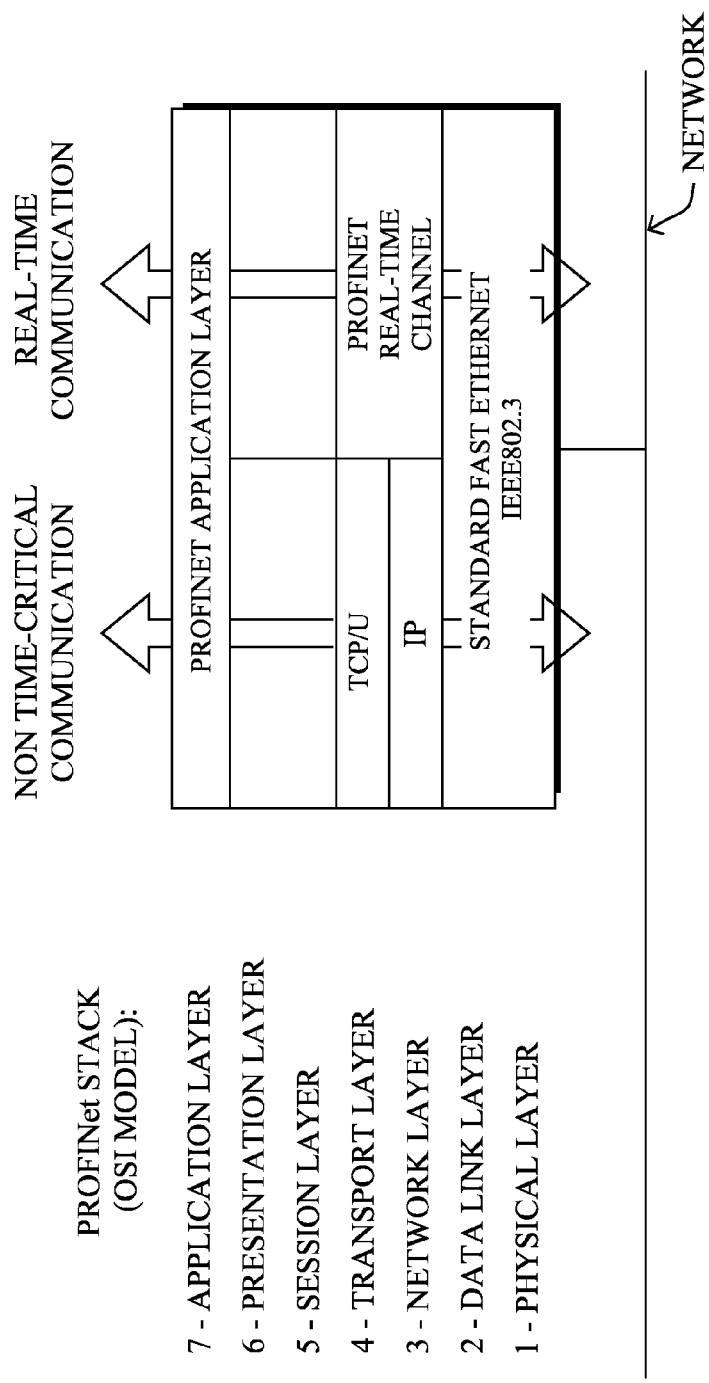
FIG. 4 illustrates an example simplified PROFINET stack.

FIG. 4 illustrates an example of the PROFINET stack 400, in comparison to the known OSI Model of a network. In general, there are non-time-critical communications, and real-time communications, as shown.

Figure 5A:
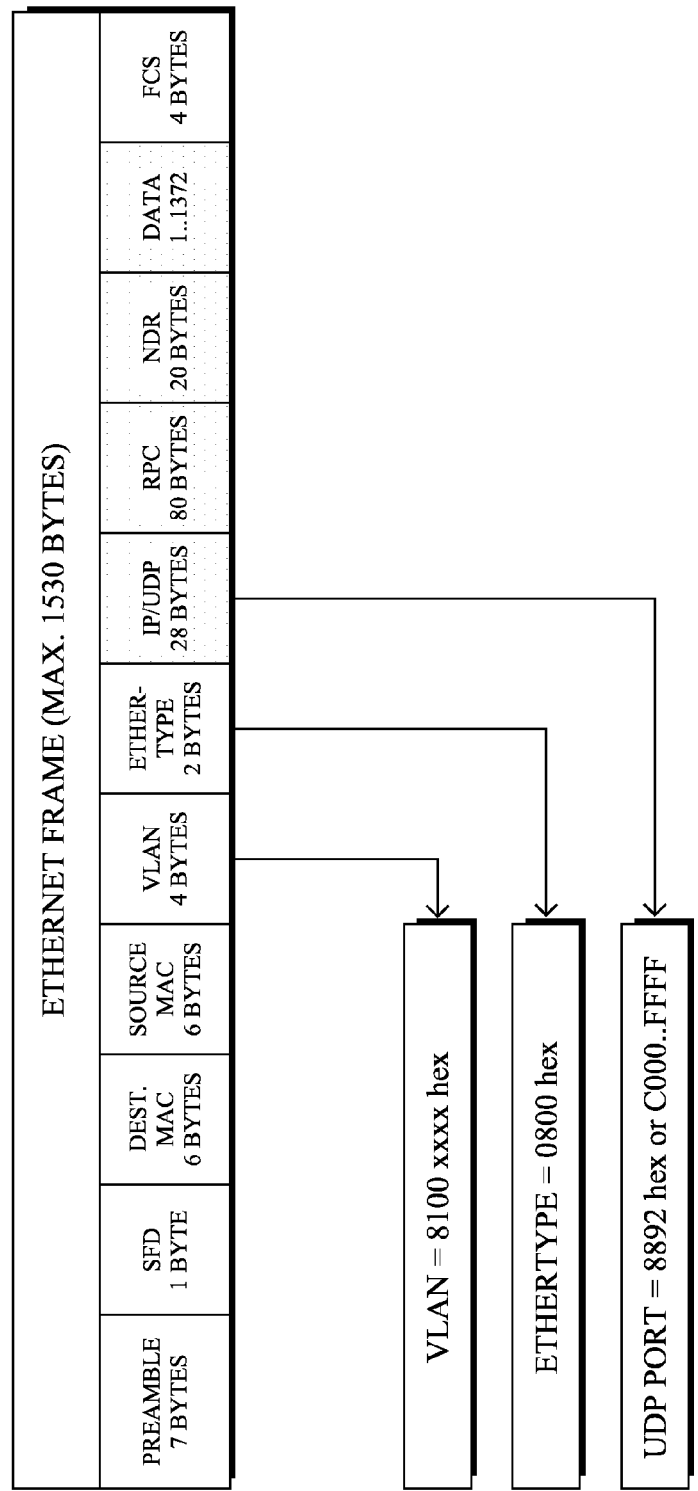
FIGS. 5A-5C illustrate example simplified PROFINET frames.
Figure 5B:
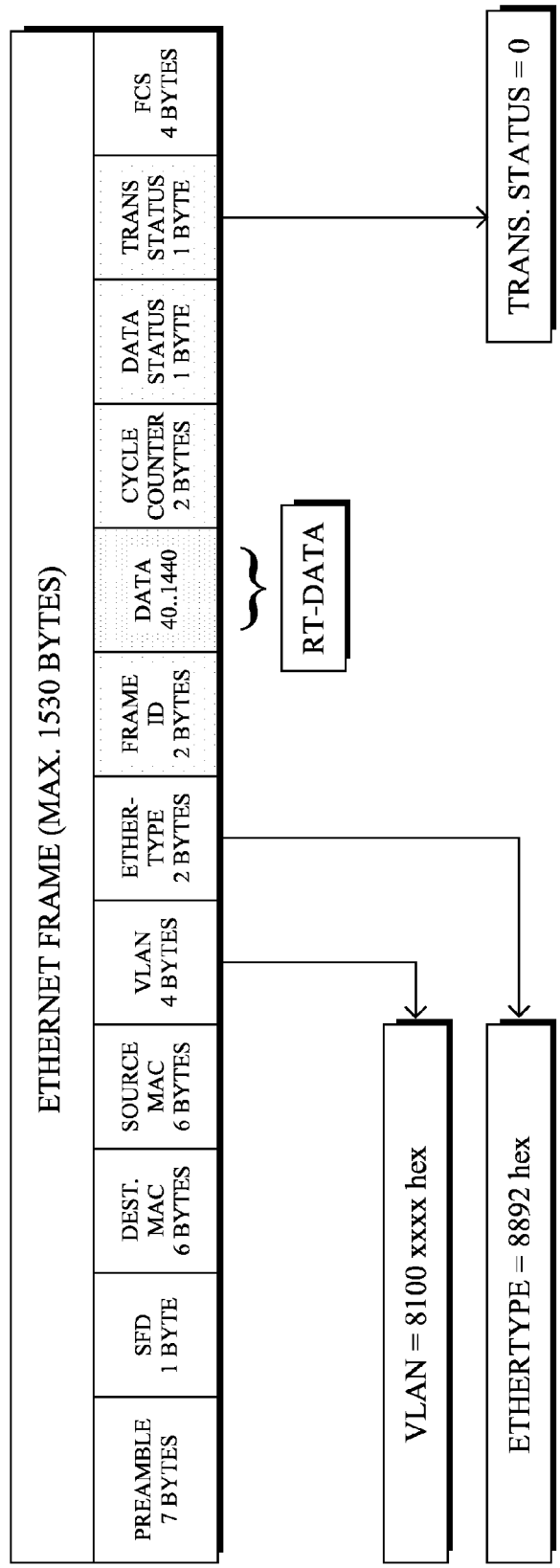
Figure 5C:
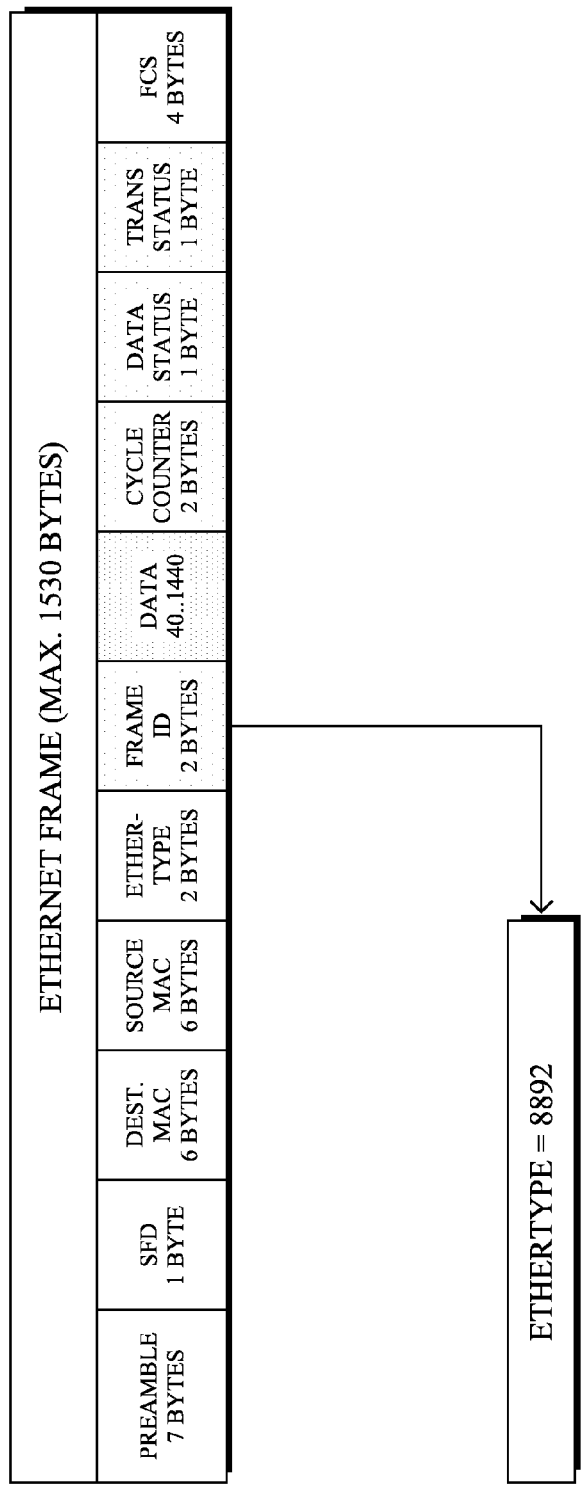

FIGS. 5A-5C illustrate example message structures for the three communication channels mentioned above. In particular, the non-real-time message structure 510 is shown in FIG. 5A, the real-time message structure 520 is shown in FIG. 5B, and the isochronous real-time message structure 520 is shown in FIG. 5C.

Figure 6:
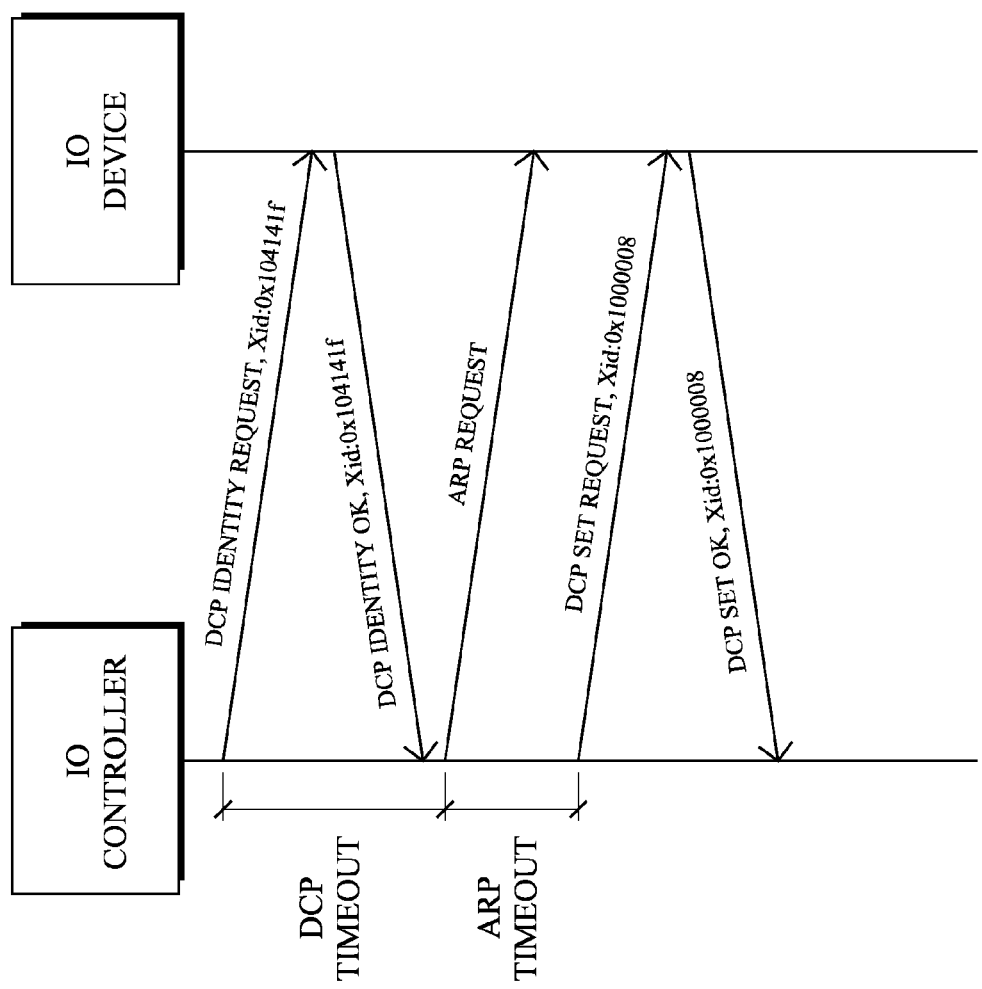
FIG. 6 illustrates an example simplified discovery and configuration protocol (DCP) message exchange.

The PROFINET discovery and configuration protocol (DCP) allows for the identification of IO-Devices by the IO controller, and is performed using the PROFINET "Device Name" exchange. In particular, the DCP protocol uses the DCP-Set Frame messaging to set unique device names for IO Devices during the engineering phase. The device name has to be unique for the whole network. When the IO controller starts processing, it verifies the IO device reachability by using the DCP-Identify frames to establish the Application Relation (AR). Also, to assign an IP address to the IO-device, the controller verifies the IP is not used in the network using an address resolution (e.g., Address Resolution Protocol or "ARP") request. If not already in use, the IO-controller assigns the IP to the device using a DCP-Set Frame. This is illustrated generally in FIG. 6, as an exchange between the IO controller (310) and an IO device (320).

Generally, for PROFINET DCP, all PROFINET packets are marked with Ether Type—0x8892. The individual messages of DCP are differentiated by the PROFINET Frame IDs. For example, as shown in FIG. 7A (showing an example Wireshark Capture 710):

DCP Identity request–Frame ID=0xfefe, Service Type=0 (Request). Conversely, as shown in FIG. 7B (Wireshark capture 720):

DCP Identity OK–Frame ID=0xfeff, Service Type=1 (Response Success). Furthermore, as shown in FIG. 7C (Wireshark capture 730):

DCP SET Request–Frame ID:0xfefd, Service Type=0 (Request). Lastly, as shown in FIG. 7D (Wireshark capture 740):

DCP SET OK–Frame ID:0xfefd, Service Type=1 (Response Success).

Notably, there are different types of attacks that could be problematic to an industrial automation network, particularly one employing the current PROFINET standard.

Figure 8A:
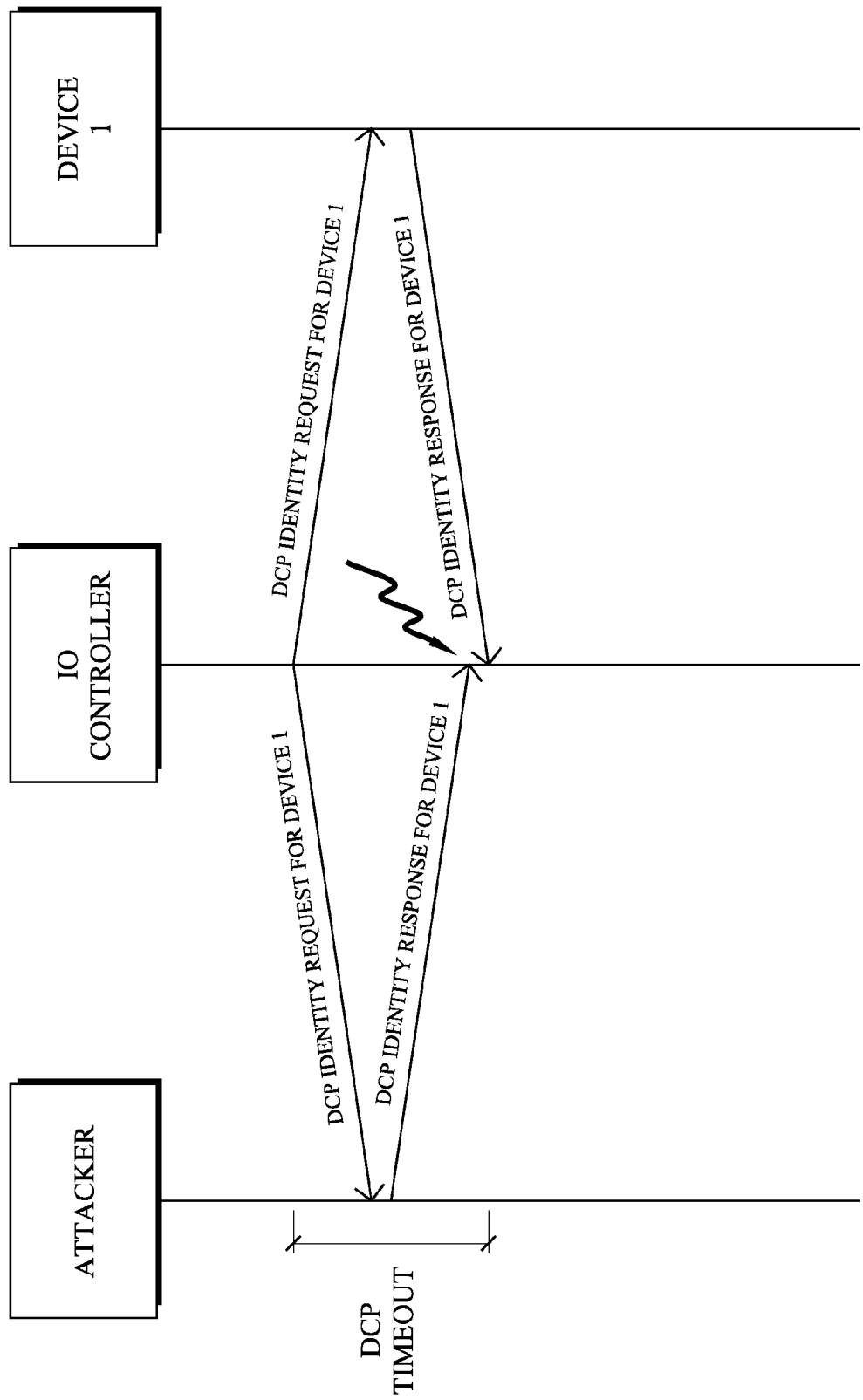
FIGS. 8A-8C illustrate example simplified attack scenarios.
Figure 8B:
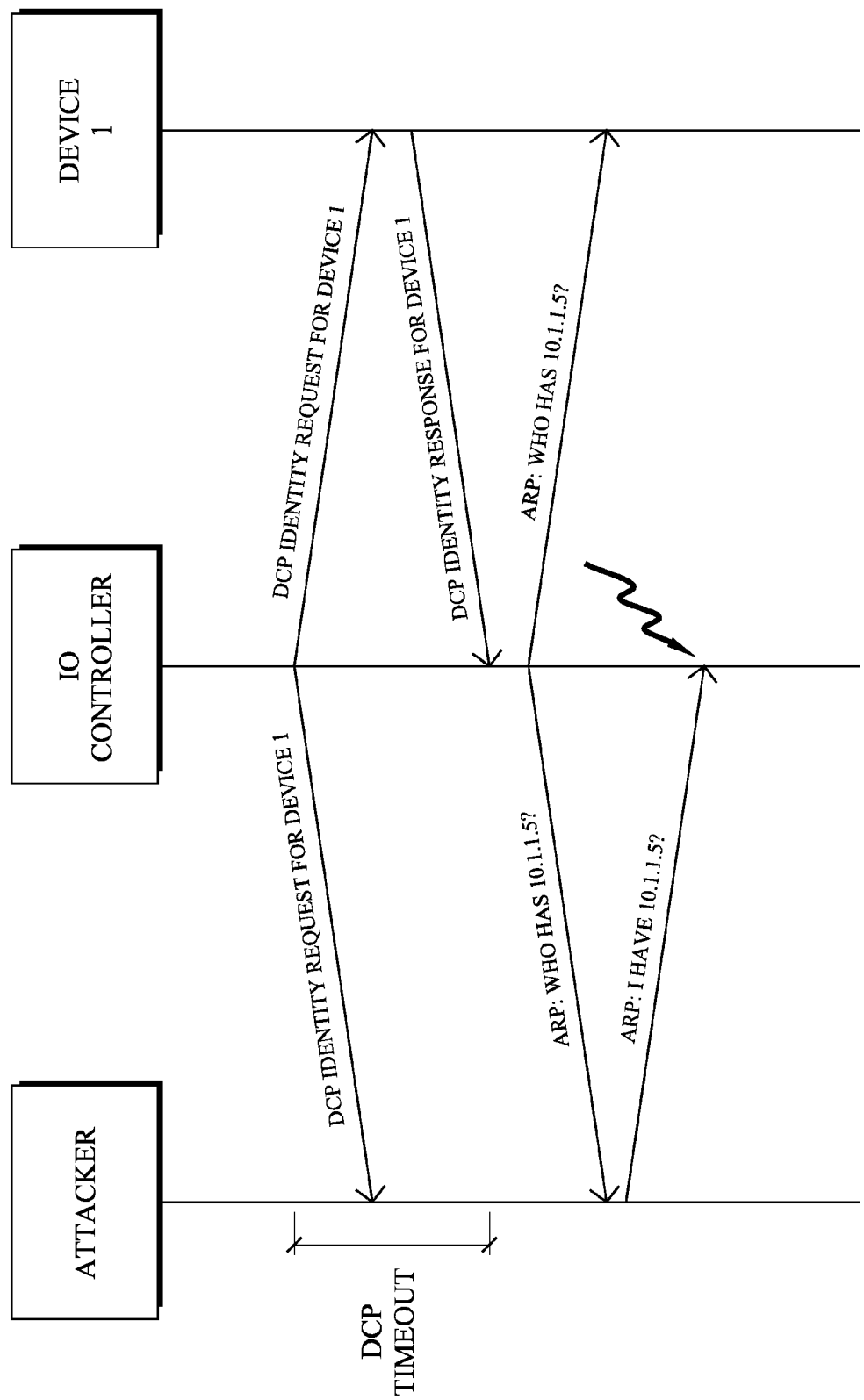
Figure 8C:
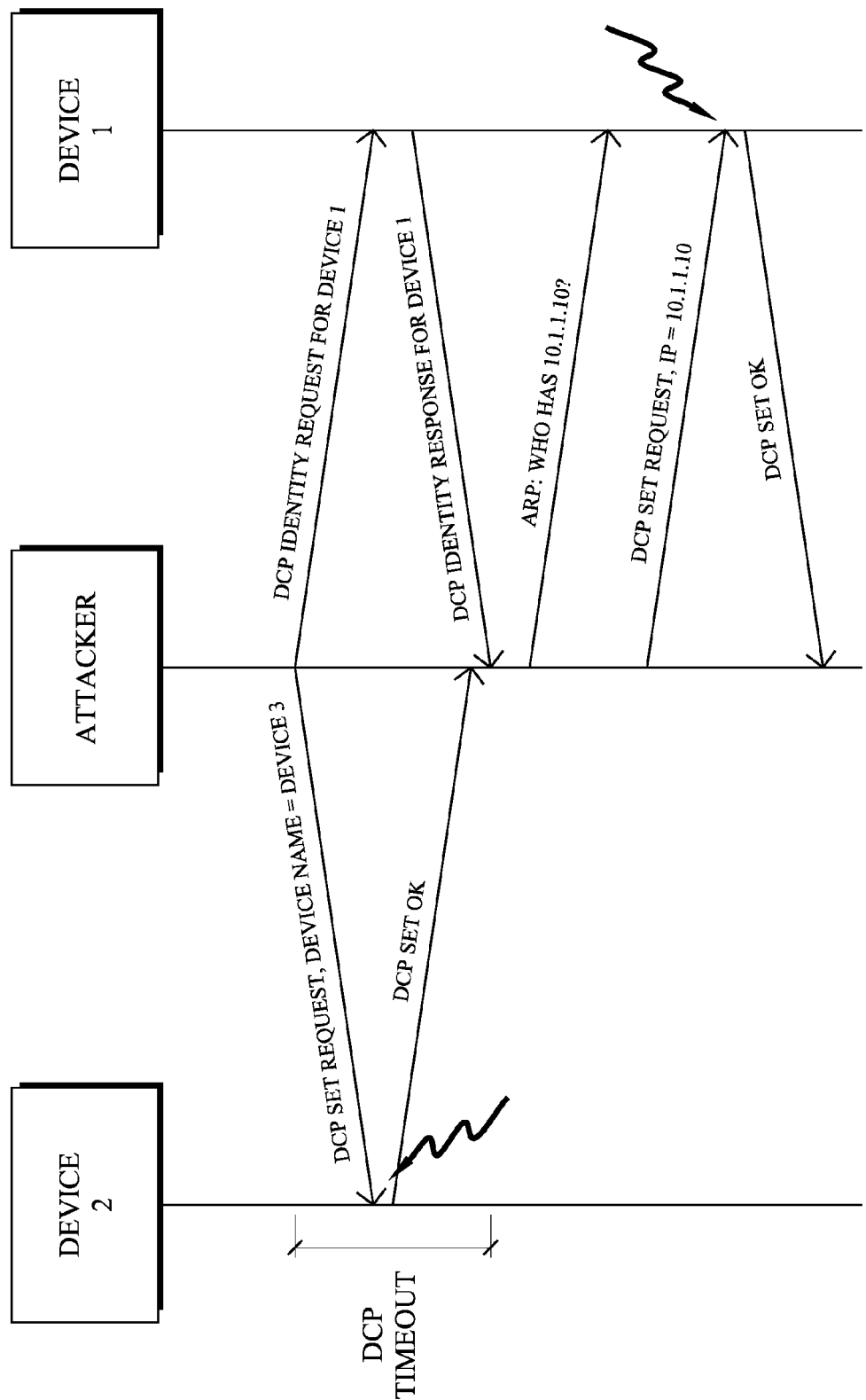

1.) Attacker spoofing a device name:—As shown in FIG. 8A, a rogue device ("attacker") could reply to the DCP Identity Request. If there are multiple replies for a DCP-Identify frame, the protocol specification halts processing and AR setup fails.
2.) Attacker spoofing an IP address:—As shown in FIG. 8B, an IO controller uses an ARP request to affirm the IP address is not in use before assigning to the IO device. If a rouge device replies to the ARP requests, the AR setup would fail and the DCP protocol restarts.
3.) Attacker changing the device names and IP address on IO devices:—As shown in FIG. 8C, an attacker could scan the network and modify the device names and IP addresses using the DCP Set Frames. There is no method in the PROFINET protocol to verify only the authorized IO controllers are allowed to modify these parameters.

Layer-2 Security for Industrial Automation

The techniques herein add security features to industrial automation protocols (e.g., PROFINET) by snooping the protocol by an intermediate switch between an I/O controller and the associated devices (e.g., IO devices, drivers, safety devices, sensors, actuators, etc.) in the network. A salient feature of the mechanisms proposed herein is that they don't modify the existing protocols (e.g., PROFINET), and thus do not require changing such protocols in order to benefit from the enhanced security.

Specifically, according to one or more embodiments of the disclosure as described in detail below, a switch in a computer network listens to a device naming exchange (e.g., a DCP SET packet Request) on one or more trusted interfaces of the switch to learn device names of devices reachable on interfaces of the switch. The switch then listens to the device naming exchange (e.g., a DCP SET OK Response) to learn a corresponding interface of the switch on which each particular device, with a learned device name, is reachable, and associates each learned device name to the learned corresponding interface for that particular device, accordingly. The switch may then allow identity responses from only learned device names on their corresponding interface. In other embodiments, the switch also listens to an Internet Protocol (IP) address assigning exchange (e.g., a DCP SET Request frame) on the one or more trusted interfaces of the switch to learn IP addresses assigned to each particular device, and associates each learned IP address with a corresponding learned device name and its corresponding interface. The switch may then allow address resolution responses from only learned IP addresses from their corresponding learned device names on their corresponding interface.

Illustratively, the techniques described herein may be performed by hardware, software, and/or firmware, such as in accordance with the processes 244 and 247 shown in FIG. 2, which may include computer executable instructions executed by the processor 220 (or independent processor of interfaces 210) to perform functions relating to the techniques described herein.

Operationally, the techniques herein propose a DCP snooping method to snoop DCP packets at a switch 110 (e.g., within the connectivity of the Ethernet/Network of FIG. 3) to prevent the above discussed security threats.

As a first component of the techniques herein, switch 110 may create a DCP Protocol Snooping database, where switches in the network snoop (listen for) all DCP packets to build a DCP snooping database. In particular, in a first illustrative stage, device names configured for the IO devices during an engineering phase (as it is referred to within the PROFINET standard) may be snooped by the switch, such as from the field "NameOfStation" present in a DCP SET Request frame. Notably, according to the techniques herein, DCP Set Request packets are allowed ingress only on trusted ports.

(Example: PROFINET DCP, Set Req, Xid:0x1020028, NameOfStation: "Device1")

The Device Name is marked corresponding to the interface on which it was snooped in the DCP Snooping database. An example state of a DCP Snooping database 900 after the Engineering phase of configuring the Device names (and before DCP provides an IP address to devices) is shown in FIG. 9A (snooping/listening to a device naming exchange). Illustratively, the database (e.g., table) 900 may comprise a listing of interface identifiers 910, device names 920, IP addresses 930, and MAC addresses 940. Notably, the device names may be made sticky (i.e., persists across switch reboots) to the interface on which the designated IO device is connected.

In addition, identity responses corresponding to only the device name in the DCP snooping table would be permitted in the respective interface. (Accordingly, the device name attached to an interface will change only if the device name of the connected IO device is modified using DCP Set Frame from the IO controller.) An illustrative command to make the device name sticky:

IP Security Profinet Device Name Sticky

In a second illustrative stage of the techniques herein, the IP address column 930 in the table 900 may be populated by snooping the DCP Set Request Frames for IP addresses coming from only the trusted ports on the switch. FIG. 10 illustrates an example Wireshark capture 1000 of an example DCP SET Request Frame for an IP address. Referring to FIG. 9B, the state of the DCP snooping table 900 after the IP address assignment phase (snooping/listening to an IP address assignment exchange) now includes the associated IP addresses of the devices as well.

Notably, in one or more embodiments herein, since Dynamic ARP Inspection (DAI) leverages the DHCP snooping database to prevent ARP spoofing in the DHCP environment, DAI may be extended to leverage the DCP snooping database 900 to prevent ARP spoofing and device name spoofing for PROFINET devices.

Figure 11:
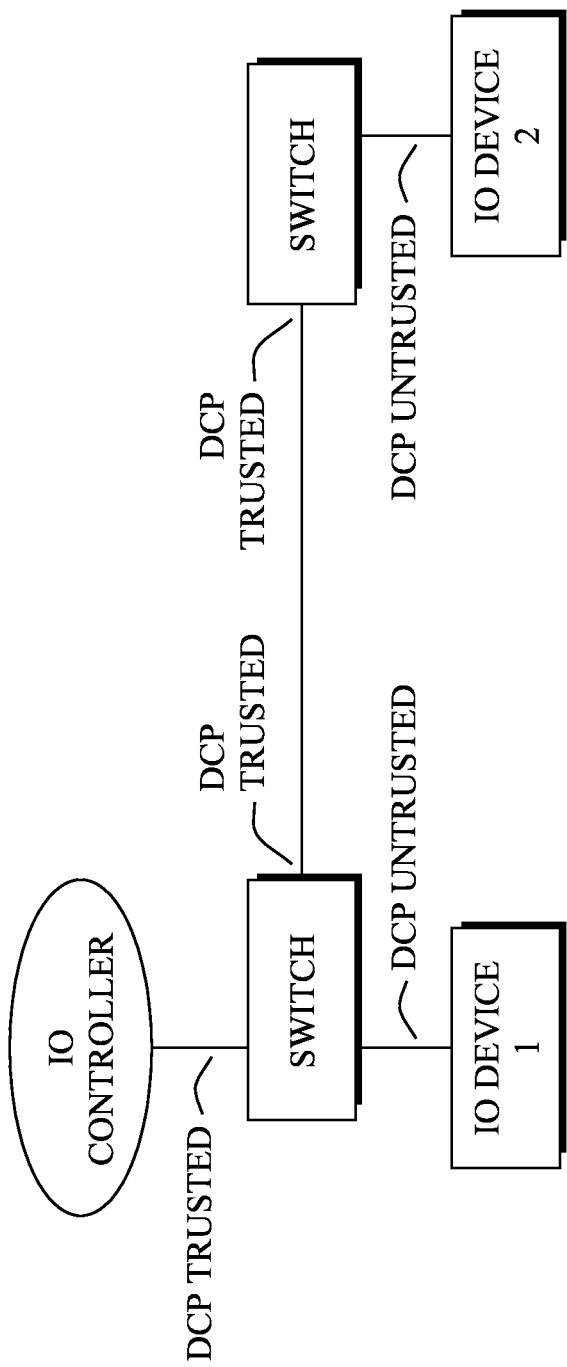
FIG. 11 illustrates an example simplified industrial automation network with trusted and untrusted interfaces.

With regard to DCP trusted and DCP untrusted interfaces on a switch, the DCP Set Request Frame used to set the device names and IP addresses are allowed only on the DCP trusted interfaces according to the techniques herein. By default, all the interfaces on the switch may be treated as untrusted. As shown in FIG. 11, the interfaces connected to the IO controllers are configured as DCP trusted interfaces along with the trunk links connecting the switches. The DCP Set Request Frames on any untrusted interfaces of the switch are blocked. Notably, there could be two different actions on the ports violating the roles—restrict or protect. In the restrict action, only the violating packets are dropped. In the protect action, the violating ports may be disabled for a predetermined time interval or until administrator intervention.

As illustrations to the techniques herein, three different scenarios are presented below:

Scenario 1

Figure 13:
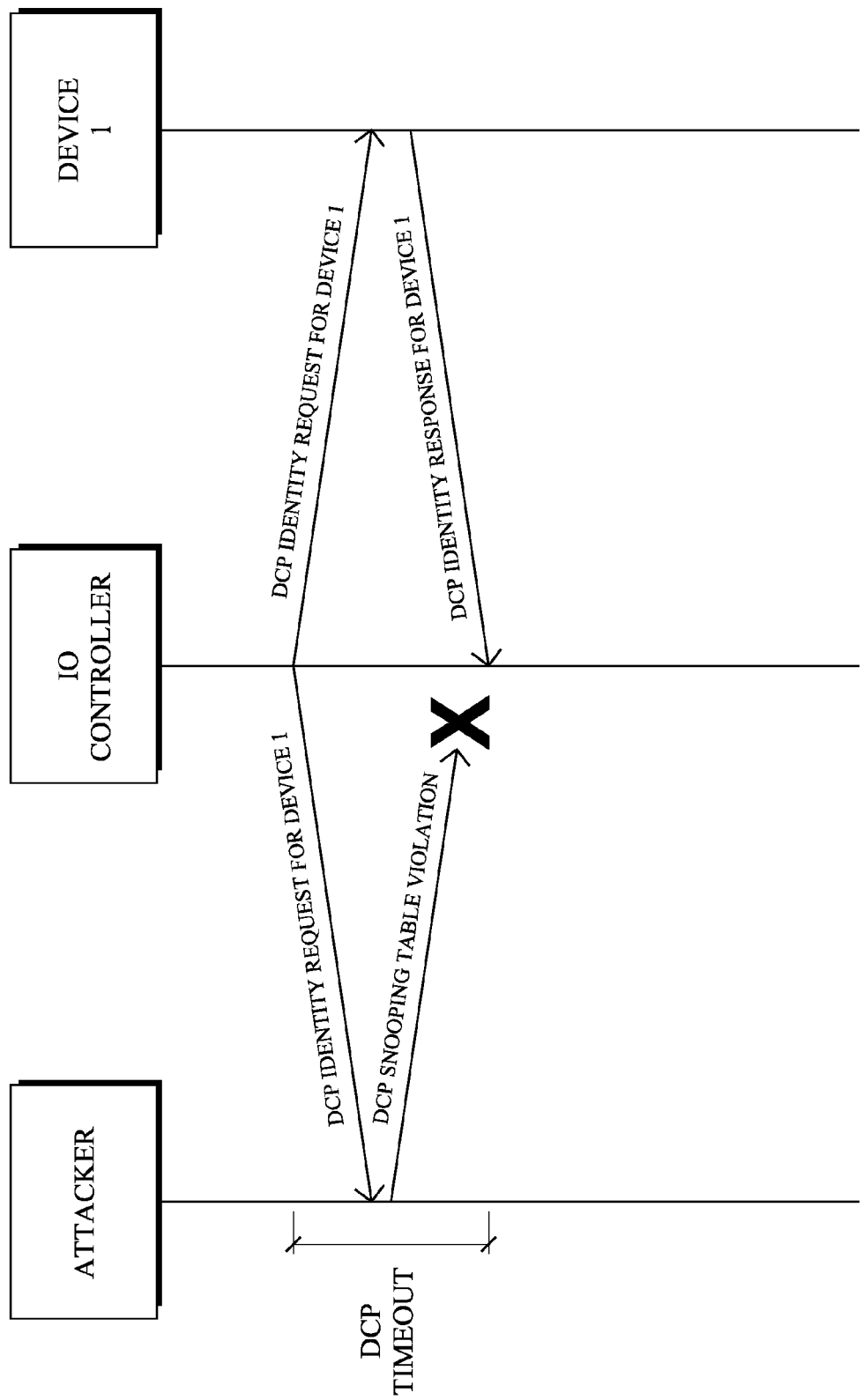
FIG. 13 illustrates an example simplified attack mitigation scenario.

Assume the state of a DCP snooping table 900 as shown in FIG. 12. In particular, as shown in FIG. 13, a rouge device may attempt to connect to the network on port Gi0/3 and sends a fake Identity Response to the DCP Identity Requests it sees on the network. The real IO device (device 1) would be sending valid DCP Identity Response at the same time. This could cause the DCP protocol to re-start as the controller would perceive this as multiple devices on the network with the same device name.

According to the techniques herein, the switch will see two Identity Responses for the Identity Request on both Gi0/1 and Gi0/3 interfaces. As such, the switch will compare the "NameOfStation" field in the identity response packet to the DeviceName Field in the DCP snooping database. The Gi0/3 Packet would thus be dropped since the Device names do not match (from the above table) on this interface, and the port can illustratively be put in disabled state.

Scenario 2

In the second example scenario, the rouge device connects to the network and sends fake ARP replies to the ARP requests sent from the IO controller before setting an IP to an IO device. This would derail the IP address assignment flow and the AR setup would fail.

Figure 14:
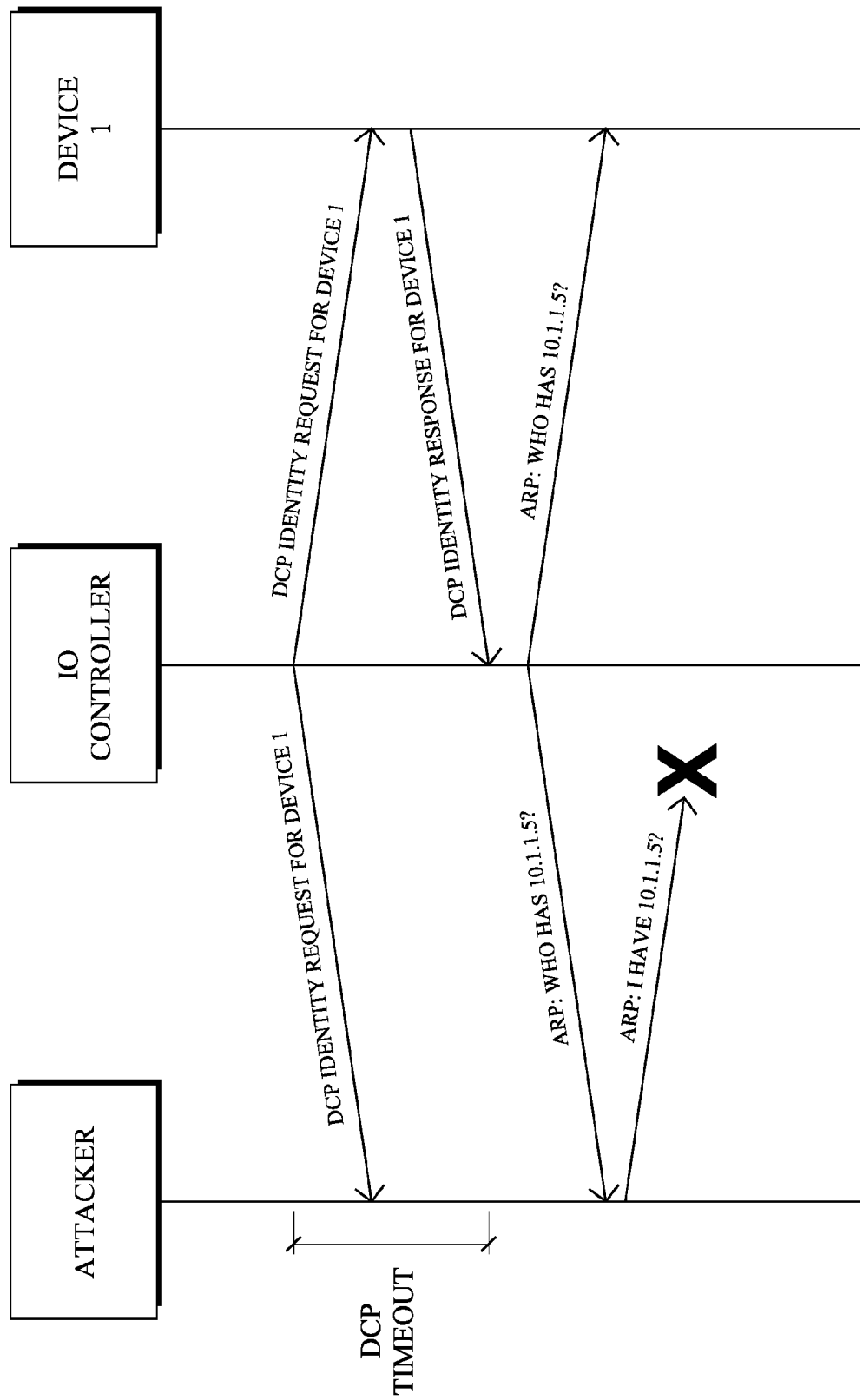
FIG. 14 illustrates an example simplified attack mitigation scenario.

As shown in FIG. 14, with the DCP snooping table and DAI, the DCP snooping table (in addition to the DHCP snooping table) would be checked to verify the validity of the ARP response. Any rogue device which comes on the network with a static IP address would also not be able to send ARP responses, as the DCP snooping table would not have the corresponding valid entry. The violated port could then illustratively either be shut down or disabled.

Scenario 2 Corner Case

Figure 15:
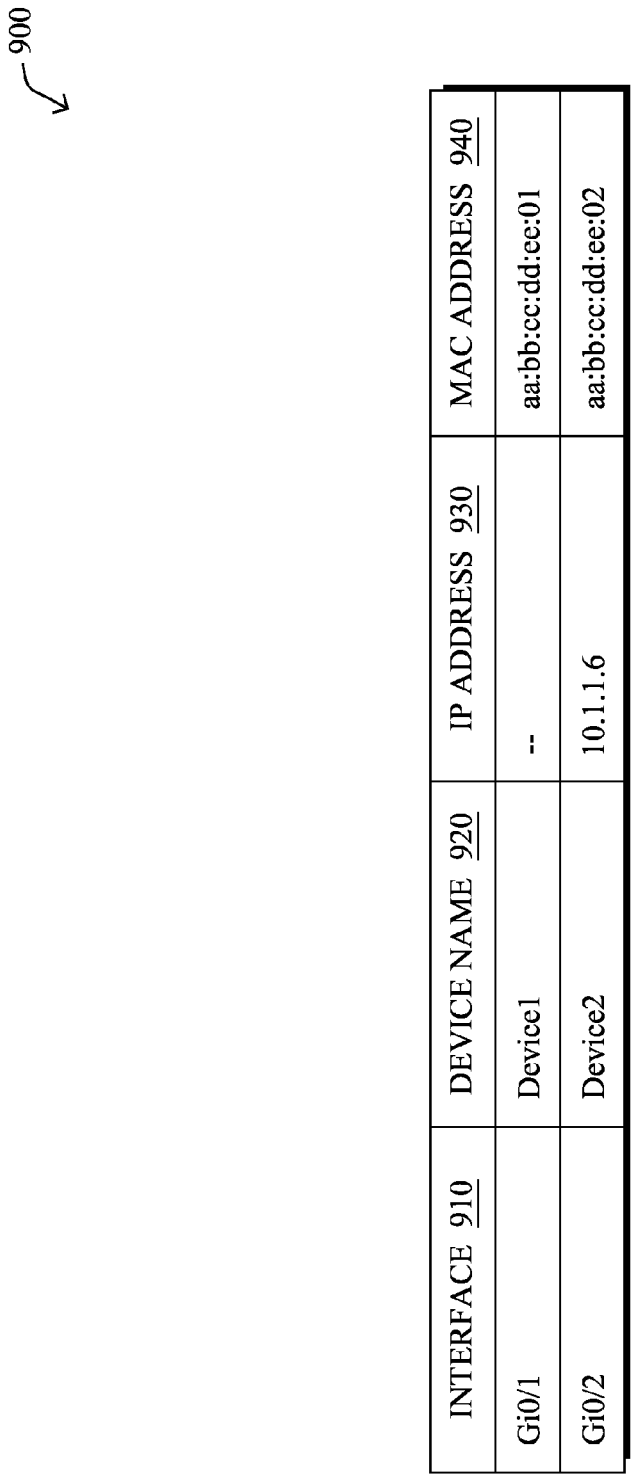
FIG. 15 illustrates an example simplified DCP snooping table.

A genuine IO device with an IP address configured could reboot on the network, thus erasing the IP address entry in the DCP snooping database for the interface connected to the device as shown in FIG. 15. If the IO device stores the IP address in its volatile memory, then the device would have lost the IP address on reboot. Once the IO device comes back up, the IO controller would set the IP address again for the device using DCP Set Frames. This would complete the DCP snooping table with the IP addresses.

Figure 16:
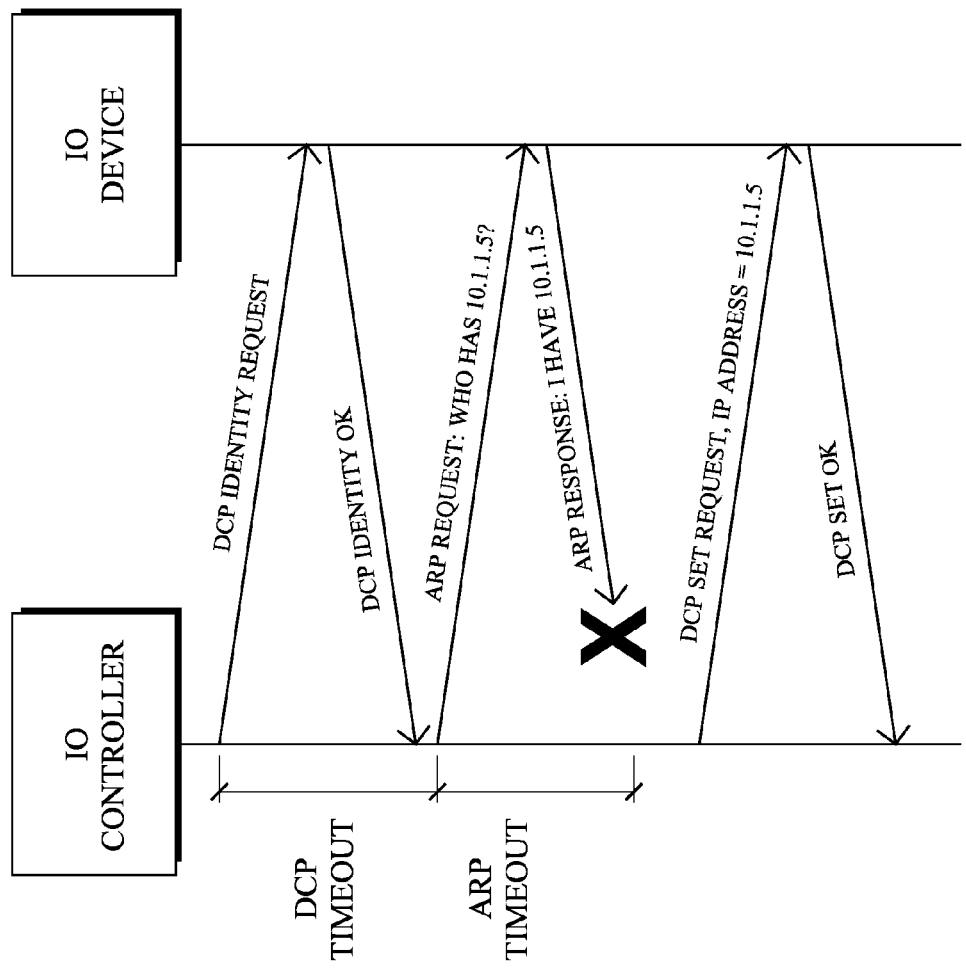
FIG. 16 illustrates an example simplified DCP message exchange.

In the case where IO device stores the IP address in non-volatile memory, it would retain the IP address on reboot. When the IO Controller sends an ARP request for the IO device IP address after receiving an Identity Response from the device, it would respond with ARP response. But the ARP response from the IO device would be blocked by dynamic ARP inspection as the DCP snooping database would be incomplete, again as shown in FIG. 15. Subsequently, the normal DCP protocol flow would ensure the IO device would be reassigned the IP address by the IO controller using DCP Set Frame as shown in FIG. 16.

Accordingly, in both the cases when the IO device holds IP address in volatile or non-volatile memory, the DCP Snooping database 900 would complete after reboot and ensure protection against ARP and device name spoofing, as shown in FIG. 17.

Scenario 3

Figure 18:
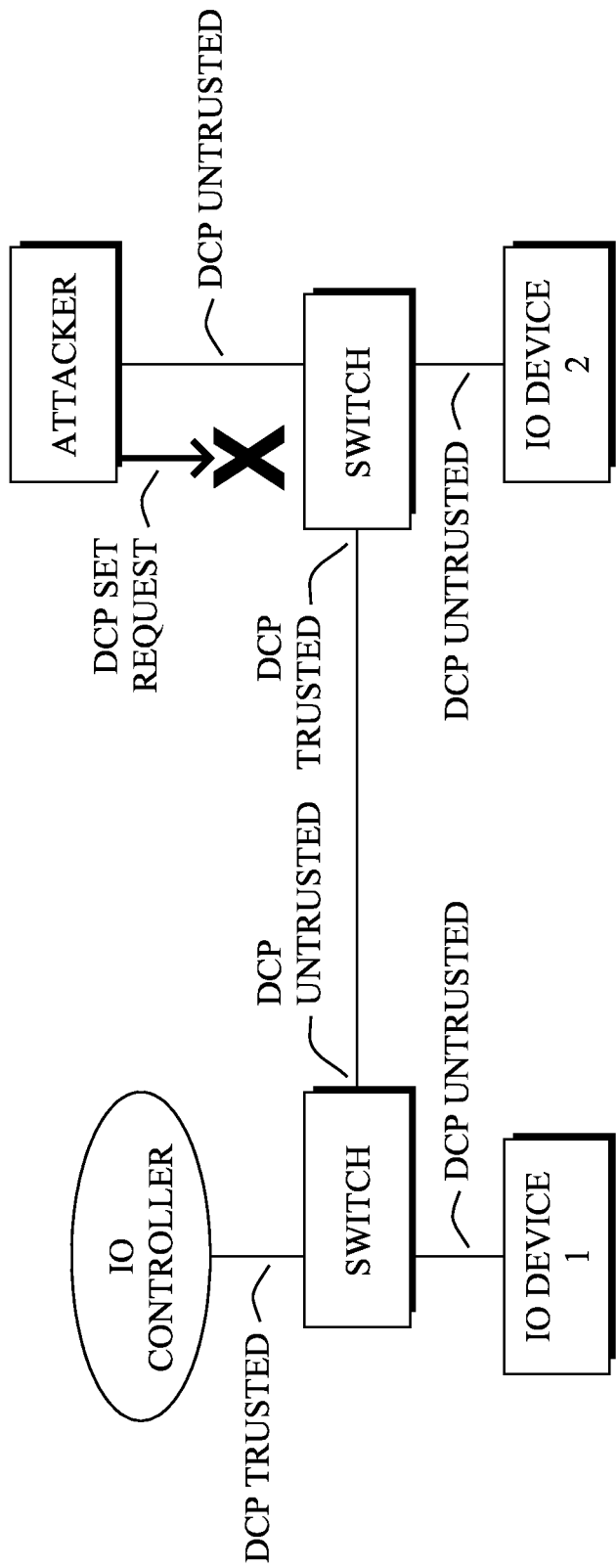
FIG. 18 illustrates an example simplified industrial automation network with a DCP Set Request attack mitigation scenario.

Notably, an attacker could insert a rouge device in the network and try to change the Device Names and IO device IP addresses on the network. With the DCP snooping trusted and untrusted port definition, all the ports are in default a DCP untrusted state and block all the DCP Set Request frames. Only the ports connecting to the genuine IO controllers are configured as DCP trusted interface, allowing them to establish AR with IO devices, as shown in FIG. 18. As such, according to the techniques herein, the violated port can be shut down or disabled, and a log could be generated.

Closing Remarks

Figure 19:
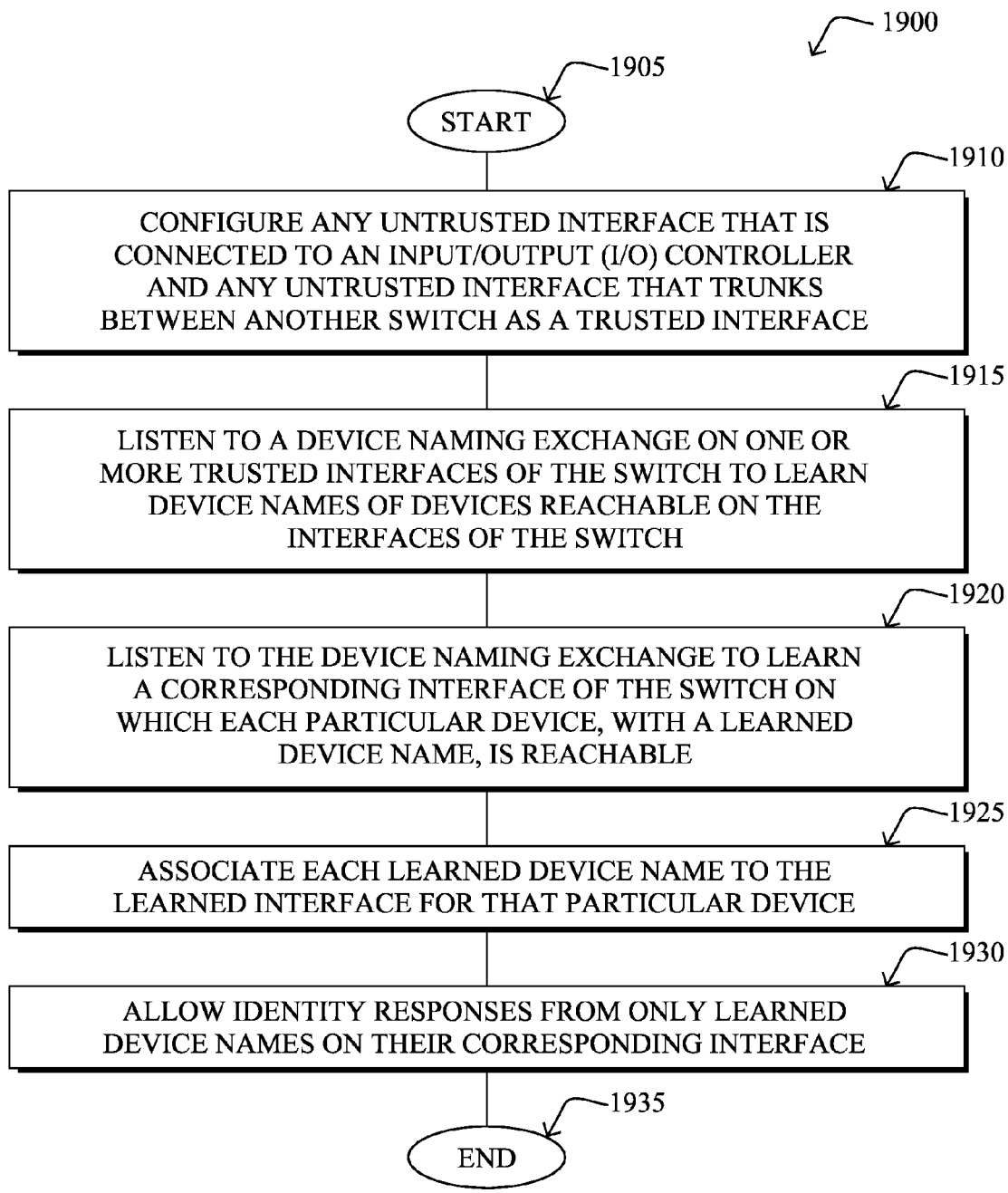
FIG. 19 illustrates an example simplified procedure for providing for layer-2 security for industrial automation by snooping discovery and configuration messages.

FIG. 19 illustrates an example simplified procedure for providing for layer-2 security for industrial automation (e.g., the PROFINET protocol) by snooping discovery and configuration messages (e.g., DCP snooping) in accordance with one or more embodiments described herein. The procedure 1900 may start at step 1905, and continues to step 1910, where, as described in greater detail above, interfaces of a switch 110 (e.g., in an industrial automation network), which are untrusted by default, may be configured as a trusted interface if they are connected to an I/O controller or are a trunk between another switch in the computer network. In step 1915, the switch may then listen (snoop) to a device naming exchange (e.g., PROFINET Device Name messaging, such as a DCP SET Packet Request) on the one or more trusted interfaces of the switch to learn device names of devices reachable on interfaces of the switch. Next, in step 1920, the switch may then listens to the device naming exchange (e.g., a DCP SET OK Response) to learn a corresponding interface of the switch on which each particular device, with a learned device name, is reachable. As such, in step 1925, the switch may then associate each learned device name to the learned interface for that particular device, such as in a DCP snooping database/table 900 as described above. Note that the switch may also store media access control (MAC) addresses of each learned device name in step 1925 as well. Note further that as described above, the switch may persist associations across reboots of the switch (i.e., making the stored values "sticky", as mentioned above). According to the techniques herein, the switch may then be configured to allow identity responses in step 1930 from only learned device names on their corresponding interface. As detailed above, this may also be accompanied by restricting disallowed responses by dropping the disallowed responses, and/or protecting against disallowed responses by disabling interfaces of the switch on which a disallowed response is received (e.g., until one of either expiration of a period of time or administrator intervention). The simplified procedure 1900 may then end in step 1935, notably with the option to continue learning and allowing/disallowing as necessary.

Figure 20:
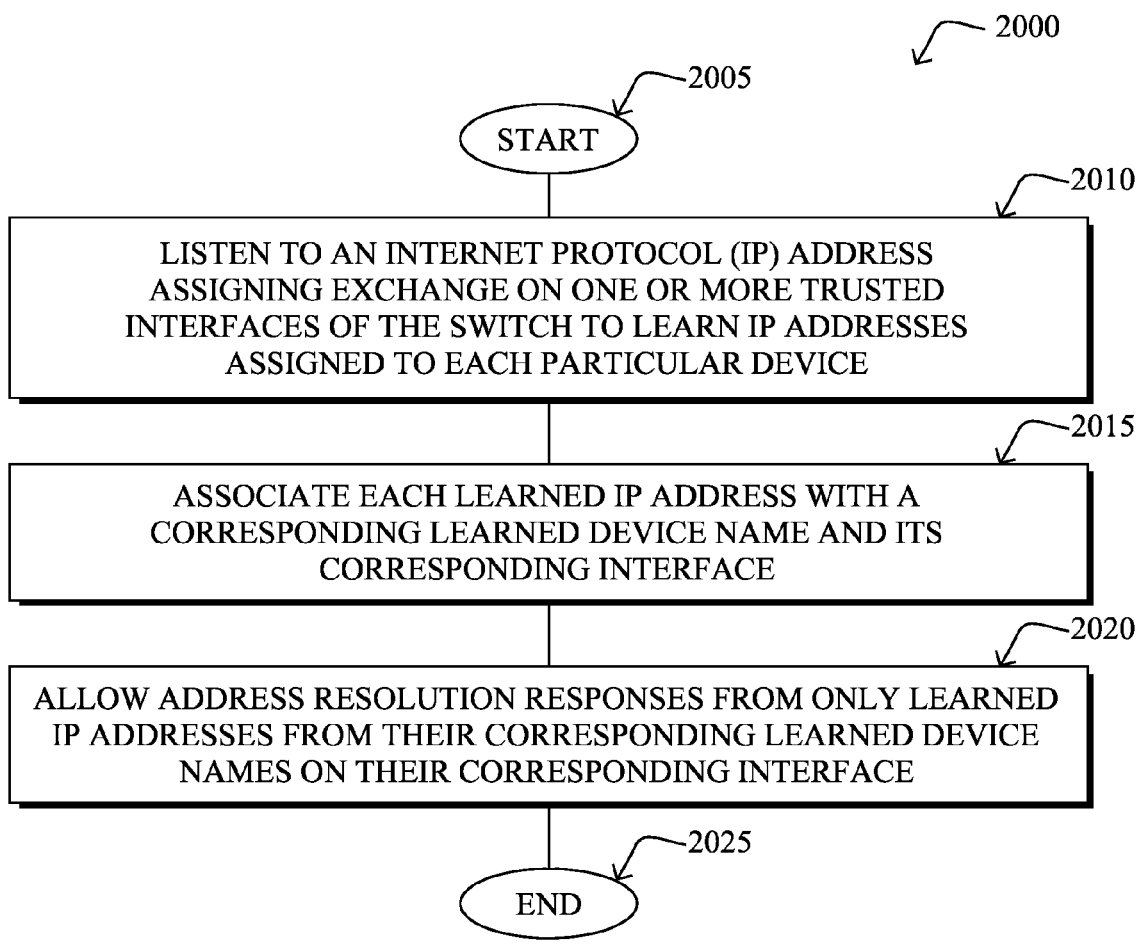
FIG. 20 illustrates another example simplified procedure for providing for layer-2 security for industrial automation by snooping discovery and configuration messages.

In addition, FIG. 20 illustrates another example simplified procedure for providing for layer-2 security for industrial automation by snooping discovery and configuration messages in accordance with one or more embodiments described herein. The procedure 2000, which may be associated with procedure 1900 of FIG. 19 or else may be a separate procedure entirely, may start at step 2005, and continues to step 2010, where, as described in greater detail above, the switch listens to an IP address assigning exchange (e.g., a DCP SET Request) on the one or more trusted interfaces of the switch to learn IP addresses assigned to each particular device. As such, in step 2015, the switch may then associate each learned IP address with a corresponding learned device name and its corresponding interface (e.g., in DCP snooping table 900), such that in step 2020, the switch may allow address resolution responses from only learned IP addresses from their corresponding learned device names on their corresponding interface, as described in greater detail above. The simplified procedure 2000 may then end in step 2025, again with the option to continue learning and allowing/disallowing as necessary.

It should be noted that while certain steps within procedures 1900-2000 may be optional as described above, the steps shown in FIGS. 19-20 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1900-2000 are described separately, certain steps from each procedure may be incorporated into each other procedure, and the procedures are not meant to be mutually exclusive.

The techniques described herein, therefore, provide for layer-2 security for industrial automation (e.g., the PROFINET protocol) by snooping discovery and configuration messages (e.g., DCP snooping). In particular, DHCP snooping alone does not have the mechanism required to secure PROFINET DCP from Layer 2 attacks, but with the DCP snooping and DAI techniques herein, the above-mentioned security issues can be addressed without any need for changes to the current PROFINET DCP Protocol.

While there have been shown and described illustrative embodiments that provide for layer-2 security for industrial automation (e.g., the PROFINET protocol) by snooping discovery and configuration messages (e.g., DCP snooping), it is to be understood that various other adaptations and modifications may be made within the spirit and scope of the embodiments herein. For example, the embodiments have been shown and described herein with relation to industrial automation protocols, and, in particular, the well-known PROFINET protocol as an example industrial automation protocol. However, the embodiments in their broader sense are not as limited, and may, in fact, be used with other protocols, whether for industrial automation or otherwise.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
listening, by a switch in a computer network, to a device naming exchange on one or more trusted interfaces of the switch to learn device names of devices reachable on interfaces of the switch;
listening, by the switch, to the device naming exchange to learn a corresponding interface of the switch on which each particular device, with a learned device name, is reachable;
associating each learned device name to the learned corresponding interface for that particular device;
allowing, by the switch, identity responses from only learned device names on their corresponding interface;
protecting against disallowed responses by disabling interfaces of the switch on which a disallowed response is received; and
disabling interfaces of the switch on which the disallowed response is received until one of either expiration of a period of time or administrator intervention.

2. The method as in claim 1, further comprising:
listening, by the switch, to an Internet Protocol (IP) address assigning exchange on the one or more trusted interfaces of the switch to learn IP addresses assigned to each particular device;
associating each learned IP address with a corresponding learned device name and its corresponding interface; and
allowing, by the switch, address resolution responses from only learned IP addresses from their corresponding learned device names on their corresponding interface.

3. The method as in claim 1, wherein all interfaces of the switch are untrusted by default, the method further comprising:
configuring any untrusted interface that is connected to an input/output (I/O) controller as a trusted interface of the one or more trusted interfaces; and
configuring any untrusted interface that trunks between another switch in the computer network as a trusted interface of the one or more trusted interfaces.

4. The method as in claim 1, further comprising:
restricting disallowed responses by dropping the disallowed responses.

5. The method as in claim 1, further comprising:
persisting associations across reboots of the switch.

6. The method as in claim 1, further comprising:
storing a media access control (MAC) address of each learned device name.

7. The method as in claim 1, wherein the computer network is an industrial automation network.

8. An apparatus, comprising:
one or more network interfaces to communicate as a switch with a computer network;
a processor coupled to the network interfaces and adapted to execute one or more processes; and
a memory configured to store a process executable by the processor, wherein the process is configured to:
listen to a device naming exchange on one or more trusted interfaces of the switch to learn device names of devices reachable on interfaces of the switch;
listen to the device naming exchange to learn a corresponding interface of the switch on which each particular device, with a learned device name, is reachable;
associate each learned device name to the learned corresponding interface for that particular device;
allow identity responses from only learned device names on their corresponding interface;
protect against disallowed responses by disabling interfaces of the switch on which a disallowed response is received; and
disable interfaces of the switch on which the disallowed response is received until one of either expiration of a period of time or administrator intervention.

9. The apparatus as in claim 8, wherein the process is further configured to:
listen to an Internet Protocol (IP) address assigning exchange on the one or more trusted interfaces of the switch to learn IP addresses assigned to each particular device;
associate each learned IP address with a corresponding learned device name and its corresponding interface; and
allow address resolution responses from only learned IP addresses from their corresponding learned device names on their corresponding interface.

10. The apparatus as in claim 8, wherein all interfaces of the switch are untrusted by default, and wherein the process is further configured to:
configure any untrusted interface that is connected to an input/output (I/O) controller as a trusted interface of the one or more trusted interfaces; and
configure any untrusted interface that trunks between another switch in the computer network as a trusted interface of the one or more trusted interfaces.

11. The apparatus as in claim 8, wherein the process is further configured to:
restrict disallowed responses by dropping the disallowed responses.

12. The apparatus as in claim 8, wherein the process is further configured to:
persist associations across reboots of the switch.

13. The apparatus as in claim 8, wherein the process is further configured to:
store a media access control (MAC) address of each learned device name.

14. A tangible, non-transitory, computer-readable media having software encoded thereon, the software configured to:
listen to a device naming exchange on one or more trusted interfaces of the switch to learn device names of devices reachable on interfaces of the switch;
listen to the device naming exchange to learn a corresponding interface of the switch on which each particular device, with a learned device name, is reachable;
associate each learned device name to the learned corresponding interface for that particular device;
allow identity responses from only learned device names on their corresponding interface;
protect against disallowed responses by disabling interfaces of the switch on which a disallowed response is received; and
disable interfaces of the switch on which the disallowed response is received until one of either expiration of a period of time or administrator intervention.

15. The computer-readable media as in claim 14, wherein the software is further configured to:
listen to an Internet Protocol (IP) address assigning exchange on the one or more trusted interfaces of the switch to learn IP addresses assigned to each particular device;
associate each learned IP address with a corresponding learned device name and its corresponding interface; and
allow address resolution responses from only learned IP addresses from their corresponding learned device names on their corresponding interface.

16. The computer-readable media as in claim 14, wherein all interfaces of the switch are untrusted by default, and wherein the software is further configured to:
configure any untrusted interface that is connected to an input/output (I/O) controller as a trusted interface of the one or more trusted interfaces; and
configure any untrusted interface that trunks between another switch in the computer network as a trusted interface of the one or more trusted interfaces.

* * * * *